United States Patent
Yang

(10) Patent No.: US 8,063,825 B1
(45) Date of Patent: Nov. 22, 2011

(54) COOPERATIVE POSITION LOCATION VIA WIRELESS DATA LINK USING BROADCAST DIGITAL TRANSMISSIONS

(76) Inventor: Chun Yang, San Mateo, CA (US)

( * ) Notice: Subject to any disclaimer, the term of this patent is extended or adjusted under 35 U.S.C. 154(b) by 321 days.

(21) Appl. No.: 12/436,868

(22) Filed: May 7, 2009

(51) Int. Cl.
  *G01S 3/02* (2006.01)
(52) U.S. Cl. ...................................................... 342/458
(58) Field of Classification Search ............... 342/458
  See application file for complete search history.

(56) References Cited

U.S. PATENT DOCUMENTS

| | | | | |
|---|---|---|---|---|
| 4,677,441 | A * | 6/1987 | Hofgen et al. | 342/174 |
| 5,220,332 | A * | 6/1993 | Beckner et al. | 342/125 |
| 5,414,729 | A * | 5/1995 | Fenton | 375/149 |
| 6,861,984 | B2 * | 3/2005 | Rabinowitz et al. | 342/464 |
| 6,914,560 | B2 * | 7/2005 | Spilker et al. | 342/458 |
| 7,042,396 | B2 * | 5/2006 | Omura et al. | 342/464 |
| 7,050,787 | B2 * | 5/2006 | Caci | 455/404.2 |
| 7,388,541 | B1 * | 6/2008 | Yang | 342/464 |
| 7,714,778 | B2 * | 5/2010 | Dupray | 342/357.31 |
| 2002/0126046 | A1 * | 9/2002 | Counselman et al. | 342/464 |
| 2005/0160128 | A1 * | 7/2005 | Fardanesh | 708/446 |
| 2005/0164712 | A1 * | 7/2005 | Kennedy et al. | 455/456.1 |
| 2007/0296632 | A1 * | 12/2007 | Opshaug | 342/450 |
| 2008/0068261 | A1 * | 3/2008 | Hempel | 342/357.06 |
| 2008/0186235 | A1 * | 8/2008 | Struckman et al. | 342/465 |

* cited by examiner

*Primary Examiner* — Thomas Tarcza
*Assistant Examiner* — Frank McGue
(74) *Attorney, Agent, or Firm* — LaMorte & Associates

(57) ABSTRACT

A cooperative position location device (CPLD) that integrates a broadcast digital transmission (BDT) receiver, a data link transceiver, and a displacement sensor; a computer program product tangibly stored in computer-readable media; and associated methods for receiving and processing special codes embedded in BDT signals from a plurality of transmitters to produce time of arrival (TOA) measurements thereof; for sending and receiving special messages between cooperative position location devices (CPLDs) to produce time difference of arrival (TDOA) of common events of BDT at and time of flight (TOF) measurements between the CPLDs; and for integrating differential and relative ranges between CPLDs to a plurality of BDT transmitters and displacement measurements to yield a joint position solution of the CPLDs.

27 Claims, 9 Drawing Sheets

Number of Displacements ($m$) to Make by $l(=1, 2)$ Receivers as a Function of Number of Independent Transmitters ($n$) for Two Cooperative Receivers Using Differential Range and Relative Range Measurements Only
(Additional Types of Measurements, If Available, Will Reduce Numbers of Displacements and Transmitters)

| 1st Column | 2nd Col. | 3rd Col. | 4th Col. | 5th Col. |
|---|---|---|---|---|
| | Initial Location ($m = 0$) | One Displacement ($m = 1$) | ... | $m$ Displacements |
| Transmitter 1 | 2 Eqs. with 4 Unknowns | 4 Eqs. with (4+$l$) Unknowns | ... | 2($m$+1) Eqs. with (4+$l$) Unknowns |
| Transmitter 2 | 3 Eqs. with 4 Unknowns | 6 Eqs. with (4+$l$) Unknowns | ... | 3($m$+1) Eqs. with (4+$l$) Unknowns |
| ⋮ | ⋮ | ⋮ | ⋮ | ⋮ |
| Transmitter $n$ | ($n$+1) Eqs. with 4 Unknowns | 2($n$+1) Eqs. with (4+$l$) Unknowns | ... | ($n$+1)($m$+1) Eqs. with (4+$l$) Unknowns |
| $l = 1, 2$ when $m > 0$ | Solvable for $n \geq 3$ | Solvable for $n \geq 2$ | ... | Solvable for $m \geq \left\lfloor \dfrac{4 + l}{n+1} \right\rfloor$ |

Fig. 6

COOPERATIVE POSITION LOCATION VIA WIRELESS DATA LINK USING BROADCAST DIGITAL TRANSMISSIONS

BACKGROUND OF THE INVENTION

1. Field of the Invention

The present invention relates generally to radio geolocation and particularly to cooperative receivers for position location using periodic codes in such broadcast digital transmissions as broadcast digital television (DTV) and wireless local area network (WLAN) signals.

2. Description of the Prior Art

Among different radio geolocation and navigation systems, there are two important systems in wide use today. One is the 100 kHz Long Range Navigation-C (LORAN-C) system which evolved to the present form in the mid-1950s. It uses terrestrial radio transmitters to provide navigation, location, and timing services for suitably equipped air, land and marine users, civil and military alike. A LORAN-C receiver measures the difference in times of arrival of pulses transmitted by a chain of three to six synchronized transmitter stations separated by hundreds of kilometers. There are many LORAN chains of stations around the globe. Modernization effort is underway to enhance the accuracy, integrity, availability, and continuity of the LORAN system, known as Enhanced LORAN or eLORAN for short.

The other is the increasingly popular satellite-based Global Positioning System (GPS). Fully operational since 1994, the GPS relies upon a nominal constellation of twenty-four satellites in six different orbit plans around the Earth for position location, navigation, survey, and time transfer. Each satellite carries a set of ultra precise atomic clocks and transmits pseudo-noise (PN) code modulated signals at several frequencies. By tracking four or more satellites, a user can solve for the variables of longitude, latitude, altitude and time to precisely determine the user's location and calibrate its clock. More details are provided in the books entitled, *Global Positioning System: Theory and Applications* (Vols. I and II), edited by B. W. Parkinson and J. J. Spilker Jr., AIAA, 1996; *Understanding GPS: Principles and Applications*, edited by E. D. Kaplan, Artech House Publishers, 1996; *Fundamentals of Global Positioning System Receivers—A Software Approach*, by J. B. Y. Tsui, John Wiley & Sons, Inc., 2000; and *Global Positioning System, Signals, Measurements, and Performance*, by P. Misra and P. Enge, Ganga-Jamuna Press, 2001.

Despite of its increased popularity, GPS cannot function well when the line-of-sight (LOS) view between a receiver and a GPS satellite is obstructed due to foliage, mountains, buildings, or other structures. To satisfy the requirements of location-based mobile e-commerce and emergency call location (E911), there have been ongoing efforts so as to improve GPS receiver sensitivity to operate on GPS signals of very low power level. One example is the assisted GPS (AGPS). The AGPS approach relies upon a wireless data link to distribute, in real time, such information as time, frequency, navigation data bits, satellite ephemeredes, and approximate position as well as differential corrections to special GPS receivers equipped with a network modem so as to reduce the uncertainty search space, to help lock onto signals, and to assist navigation solution. This approach, however, comes with a price associated with installing and maintaining the wireless aiding infrastructure and services.

GPS cannot function well either when GPS signal is heavily jammed or overwhelmed by unintentional interference. GPS signals may be turned off altogether from newer GPS satellites with flexible power and flexible signal capabilities when it orbits over certain region. In such circumstances, no GPS solution is available.

Amid the process of replacement of National Television System Committee (NTSC) analog television signals by an Advanced Television Systems Committee (ATSC) digital television (DTV) signal, there has been a considerable amount of efforts devoted to the use of DTV signals for position location, thus serving as a complement to and/or a substitute for GPS. This is exemplified by the U.S. Pat. No. 6,861,984, entitled, Position Location Using Broadcast Digital Television Signals, by M. Rabinowitz and J. J. Spilker Jr., issued Mar. 1, 2005.

Designed primarily for indoor reception, DTV signals exhibit several advantages. It is much higher in power (40 dB over GPS) and at lower and more diverse frequencies (nearly half of the spectrum between 30 MHz and 1 GHz). The geometry offered by a network of terrestrial DTV transmitters is superior to what a satellite constellation can provide. As such, it has better propagation characteristics with greater diffraction, larger horizon, and stronger penetration through buildings and automobiles. DTV signals have a bandwidth of 6 to 8 MHz, which is much wider than the primary lobe of GPS C/A-code (2 MHz), thereby minimizing the effects of multipath and permitting higher accuracy tracking.

With DTV transmitters fixed on the ground, their lines of sight to a user changes very slowly, only adding a small amount of Doppler shift to a DTV signal frequency. This allows the signal to be integrated over a long period of time, thus easing the task of acquisition and tracking of a weak signal considerably. As a further benefit, the component of a DTV signal that can be used for timing is of low duty factor (e.g., 1 of 313) in contract to GPS wherein the ranging code is repeatedly transmitted and has to be tracked continuously.

However, one inherent technical difficulty faced by position location using broadcast digital transmissions (BDT) such as DTV signals is the clock bias and drift of the signal timing source at a transmitter, which are unknown to a user. Although it may be possible to have all DTV stations use ultra-precise atomic clocks or GPS-disciplined clocks, the synchronization of all signal transmissions across a large region is a daily operational challenge. It may also be possible to time-tag all transmissions and embed the clock offset information in the broadcast signals for all stations in a given region. However, these approaches require coordinated involvement of local DTV operators who are in broadcasting and not time transfer business.

Many inventions exemplified by the U.S. Pat. No. 6,861, 984 by M. Rabinowitz and J. J. Spilker Jr. mentioned earlier make use of base stations, location servers, and monitor units to calibrate the DTV transmitter timing biases and to provide the calibration data to mobile users via dedicated data links. The position location mechanism in such inventions is referred to as "reference-aiding," wherein the signal source timing errors are estimated explicitly at the reference station and sent to users (a parametric approach) or the measurement difference is employed to remove the timing errors common to the reference station and users (a non-parametric approach). There is a significant cost associated with installing and maintaining the infrastructure of base stations, location servers, and monitor units on a large scale. A user has to subscribe to a service coverage in addition to special equipment for the service signals.

Clearly, a user is subject to the potential risk of service discontinuity when moving from one region (or a country for the matter) to another without a global service network in place or a valid global subscription. These prior-art approaches further prevent broadcast digital transmission (BDT) signals from being used for military applications as signals of opportunity (SOOP) because of lack of pre-surveyed reference/monitor units. In the U.S. Pat. No. 7,388,541, entitled "Self-Calibrating Position Location Using Periodic Codes in Broadcast Digital Transmissions," issued Jun. 17, 2008 to the present inventor, two position location mechanisms, referred to as "self-referencing" and "self-calibrating," respectively, are disclosed by which position location systems can make use of broadcast digital transmissions such as DTV and WLAN signals without requiring the service from external base stations, location servers, and monitor units. However, these self-aiding methods, in contrast to the above-mentioned reference-aiding methods, are useful for one user at a time and may require long time to complete the self-referencing and/or self-calibrating process.

Applications arise wherein a team of cooperative mobile users need to know not only their own location but also those of their teammates without relying upon GPS signals. By cooperative, we mean the teammates have a means to communicate to one another via a wireless data link to coordinate their activities, exchange data, and perform mutual aiding in the form of cooperative referencing and calibration. This need is met by the present invention as described and claimed below.

SUMMARY OF THE INVENTION

The present invention is (1) a cooperative position location device (CPLD) that integrates a broadcast digital transmission (BDT) receiver, a data link transceiver, and a displacement sensor, (2) a computer program product tangibly stored in computer-readable media, and (3) associated methods for (i) receiving and processing of special codes embedded in BDT signals from a plurality of transmitters to produce time of arrival (TOA) measurements thereof, (ii) for sending and receiving special messages between cooperative position location devices (CPLDs) to produce time difference of arrival (TDOA) measurements of common events of BDT at and time of flight (TOF) measurements between the CPLDs, and (iii) for integrating the differential ranges to a plurality of BDT transmitters, relative ranges between CPLDs, and displacement measurements to yield a joint position solution of the CPLDs.

A broadcast digital transmission (BDT) receiver includes an antenna and a radio-frequency (RF) front-end to intercept the incoming RF signal and to convert it to an appropriate intermediate frequency (IF) for digitization. A baseband signal processor is organized into functionally identical channels, each dynamically assigned to a different BDT transmitter. Special periodic codes of BDT transmissions such as those for synchronization are typically of low duty factor; as such, search thereof is conducted in the baseband signal processor over small overlapping data windows covering the entire code repetition interval. Once acquired, the BDT signal is tracked via a closed loop wherein update is windowed in sync with the low duty cycle so as to save precious resources. In both acquisition and tracking, the baseband signal processor performs a correlation between the incoming signal samples and a reference code over a number of code lags and for a number of Doppler frequency bins. This results in a two-dimensional delay-Doppler map of complex correlations from which the baseband signal processor further extracts the code delay and carrier phase and frequency parameters to close a joint code and carrier tracking loop and measures time of arrival (TOA) of the special codes relative to a local clock time.

In a particular embodiment, the broadcast digital transmission (BDT) is a broadcast digital television (DTV) signal and the broadcast digital television signal is an Advanced Television Systems Committee (ATSC) digital television signal. The special periodic code is a field synchronization segment with an ATSC/DTV data frame, a segment synchronization sequence within a data segment within an ATSC/DTV data frame, or a combination thereof. In addition, an ATSC DTV signal may also contain a pseudorandom sequence as a "RF watermark" that is uniquely assigned to each DTV transmitter for transmitter identification (TxID) in system monitoring and measurement, which can also serve as the special periodic code. However, different from GPS signals, general broadcast digital transmissions do not contain timing information directly. In addition, as signals of opportunity, BDT signals are typically not synchronized (in contrast to GPS wherein all satellites operate on the well-maintained GPS time). Besides, the timing source at BDT transmitters is subject to different clock bias and drift (whereas atomic clocks onboard GPS satellites are constantly calibrated by ground stations). These are inherent technical difficulties in using signals of opportunity by a standalone device to derive position location information. In the present invention, times of arrival (TOA) of the special codes measured at individual CPLDs are communicated to one another via data link transceivers to form a time difference of arrival (TDOA) so as to eliminate the clock errors of BDT transmitters.

A data link transceiver contains a data receive channel and a data transmit channel. The data receive channel includes an antenna and a RF front-end to intercept the incoming RF signal and to down-convert it to an appropriate IF for digitization. The data transmit channel includes a data modulator and a RF front-end to up-convert the modulated signal from the baseband to an appropriate RF frequency and power-amplify it prior to a transmit antenna. A data link transceiver data processor contains a receive signal processor and transmit signal processor. The receive signal processor and the transmit signal processor of two correspondent CPLDs exchange ranging messages according to a ranging protocol via request send, request receive, reply send, and reply receive to obtain relative range and time offset thereof. Furthermore, the receive signal processor and transmit signal processor communicate, by modulating and demodulating such data as times of arrival (TOA) of the special codes measured at individual CPLDs onto and from the data link, for cooperation and coordination.

However, in some practical situations, the number of independent BDT transmitters may be fewer than necessary to solve for position location unknowns or the geometrical distribution of BDT transmitters (e.g., co-located in the same transmission tower) is too poor for an accurate solution. The use of a displacement sensor as disclosed in the present invention alleviates this difficulty. A rudimentary displacement sensor can be made of a magnetic compass and a tape measure. The magnetic compass determines the direction of travel relative to the magnetic north, which can be related to a common coordinate frame in which the location of BDT transmitters are known, while the tape measure indicates the distance travelled, thus providing a displacement vector. For a wheeled ground vehicle, the average wheel speed provides an estimate of the speed, which is integrated over time to provide the distance traveled. The scaled difference between the left and right wheel speeds provides an estimate of the turning rate, which is integrated into the heading change (yaw). Together, the two measurements provide an estimate of relative velocity vector, which is integrated into a displacement vector. Inertial sensors such as accelerometers and gyros can also be mechanized to provide displacements.

An onboard/online database is used to supply a location of a plurality of transmitters. Auxiliary sensors are also available to provide other pertinent information upon demand such as weather conditions and local topographic data. A cooperative position location processor, coupled to the BDT receiver data processor, the data link receiver data processor, the displacement sensor, the onboard/online database, and a local clock, operates on time of arrival measurements of a plurality of transmitters, time of flight measurements between cooperative devices, and displacement vector measurements, to produce a joint position solution for the cooperative devices by a least-squares or Kalman fixed-point smoother in a batch or sequential processing manner.

When a BDT receiver is implemented as a software receiver, any change in broadcast signal characteristics can be easily accommodated by simply reprogramming the receiver when moving from one region or one country to another. Similarly, when a data link transceiver is implemented as a software receiver, any change in ranging protocols and signaling waveforms can be easily accommodated by simply reprogramming the transceiver. When a different displacement sensor (or other auxiliary sensors for the matter) is used, it suffices to modify sensor error models in the joint calibration and positioning solution by reprogramming. In an urban environment, the direct signal from a transmitter may be attenuated whereas the multipath signals reflected from surroundings, although arriving later in time, may appear stronger. When moving from an environment to another, the cooperative position location device can be programmed to use a channel impulse response or a generalized frequency-domain correlator (GFDC) instead of a conventional delay-lock loop (DLL). As a preferred method, the use of a channel impulse response or a GFDC in the present invention produces a major portion of the correlation function (or the entire function if desired) from which the direct signal and multipath fingerprint can be isolated. And more importantly, the impulse response or the generalized correlation peak is much sharper, thus being less susceptible to multipath and leading to better timing and ultimately to better position location.

BRIEF DESCRIPTION OF THE DRAWINGS

For a better understanding of the present invention, reference is made to the following description of an exemplary embodiment thereof, considered in conjunction with the accompanying drawings wherein:

FIG. 6 is a table illustrating the solvability of position location in terms of the number of displacements to make by cooperative receivers as a function of the number of independent transmitters;

Figure 1:
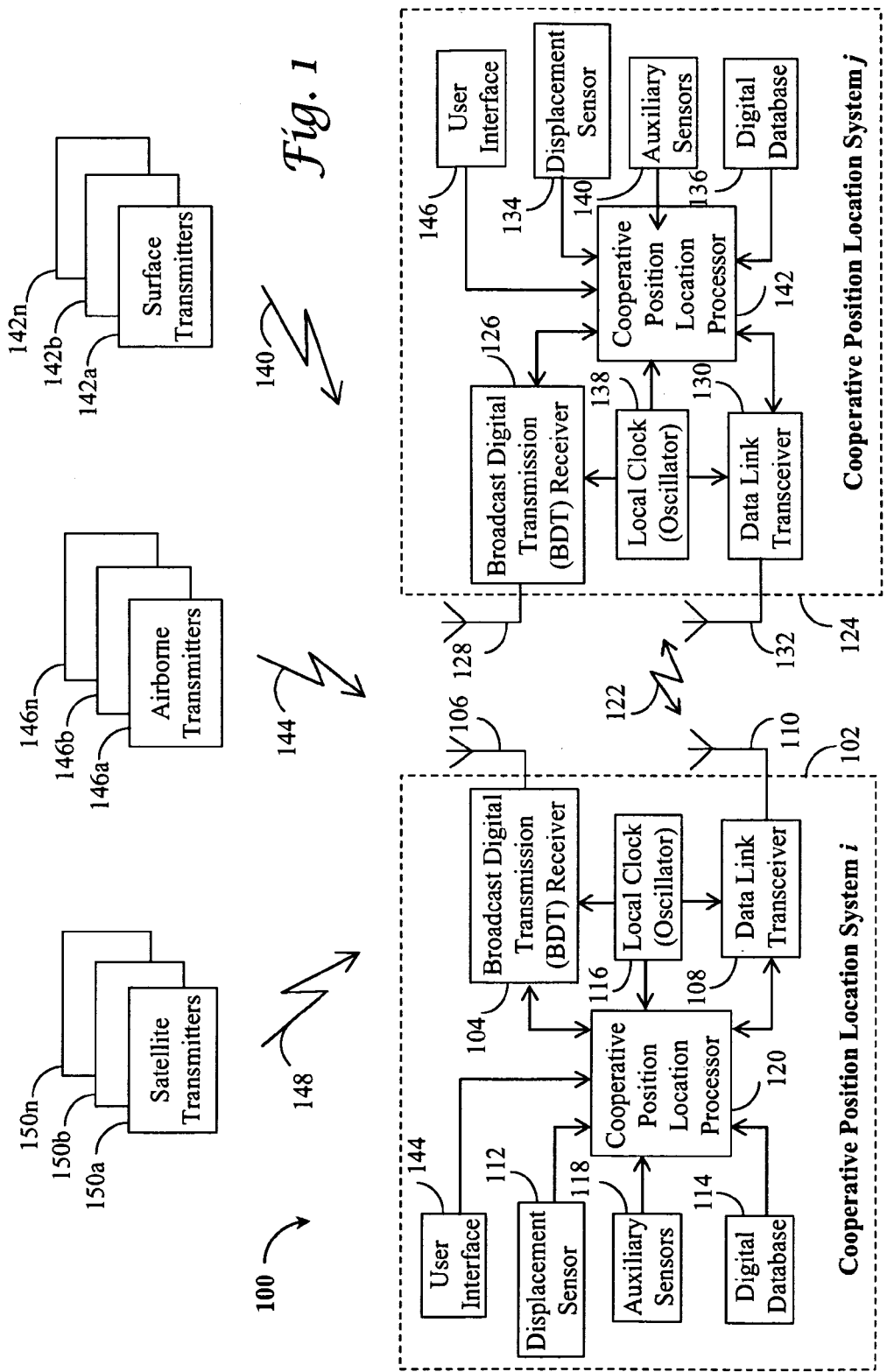
FIG. 1 is a schematic drawing illustrating an exemplary embodiment of the present invention including a pair of cooperative position location systems that receive broadcast digital transmissions (BDT) from a plurality of transmitters and communicate with each other via a data link.

The leading digit of each reference numeral used in this specification indicates the number of the drawing in which the reference numeral first appears.

DETAILED DESCRIPTION OF THE INVENTION

The present invention can be used for position location with broadcast digital transmissions (BDT) from a plurality of transmitters at known locations that employ repetitive codes for synchronization and it is particularly well suited for digital television (DTV) and wireless local area network (WLAN) signals. Accordingly, an exemplary embodiment of the present invention will be described in an application to the Advanced Television Systems Committee (ATSC) DTV signals in the United States for cooperative position location in guidance, navigation, and control. The techniques disclosed herein are applicable to other television and radio broadcasts and communication signals.

Referring to FIG. 1, an exemplar embodiment 100 of the present invention is sketched wherein two cooperative position location systems i 102 and j 124, respectively, are present. Broadcast digital transmissions 140, 144, and 148 from a plurality of transmitters are received by broadcast digital transmission (BDT) receivers 104 and 126 via antennas 106 and 128, respectively. This may include surface transmitters 142a and 142b through 142n at known locations on the ground for instances. It may also include airborne transmitters 146a and 146b through 146n with their locations either embedded in digital transmissions or made available to cooperative position location systems 102 and 124 by other means. Satellite transmitters 150a and 150b through 150n can also be used in a similar manner. In a sense, GPS satellites fall into this category because a GPS satellite broadcasts its orbit and clock information within navigation messages modulated on the radio signal. More generally, surface transmitters do not need to be fixed on the ground for use in the present invention so long as their locations at time of broadcasting are precisely known to cooperative systems 102 and 124.

Still referring to FIG. 1, cooperative position location systems 102 and 124 are connected to each other for cooperation and coordination by means of a radio channel 122 using data link transceivers 108 and 130 via antennas 110 and 132, respectively. Also included in a cooperative position location system 102 or 124 are a local clock (an oscillator) 116 or 138 that drives BDT receiver 104 or 126, data link transceiver 108 or 130, and cooperative position location processor 120 or 142 and a digital database 114 or 136 that contains such information as locations of ground transmitters and their spectrum band allocation (also referred to as a channel) as well as digital road maps and local terrain elevation/topographic information.

Referring to FIG. 1 again, a cooperative position location system 102 or 124 further includes a displacement sensor 112 or 134, which, as well as other components, will be further described in this specification later on. A user interface 144 or 146 is used to display, preferably graphically, results to and receive commands and/or data from users. Optionally, it may further include auxiliary sensors 118 or 140. This may include such popular devices as wireless Internet adapter and/or a cell phone for online access to road maps and local weather information for instance. An altimeter or a barometer may be used to provide an indication of (differential) altitude.

Figure 2:
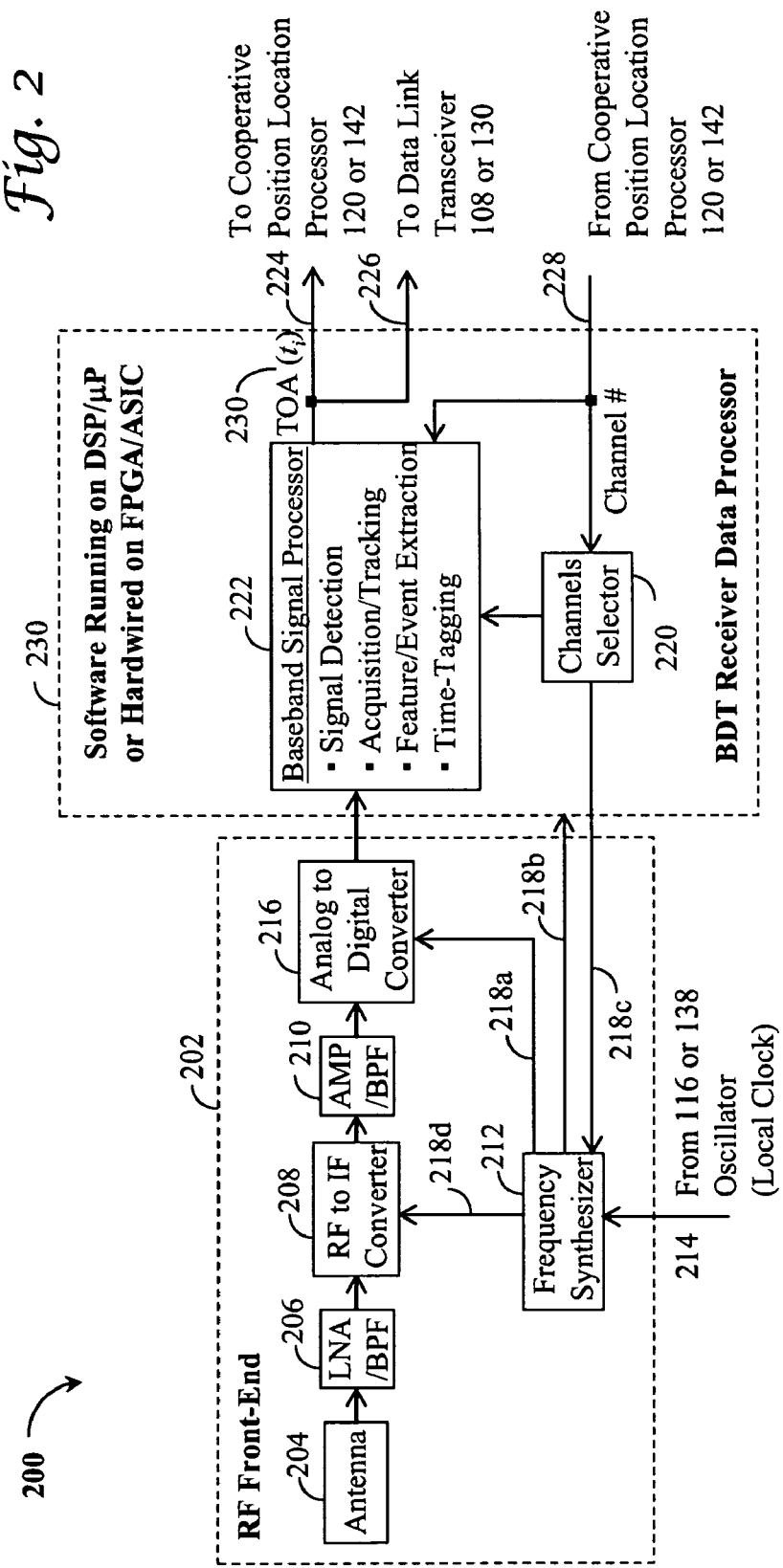
FIG. 2 is a schematic illustrating the architecture of an exemplary embodiment of a broadcast digital transmission (BDT) receiver in accordance with the present invention.

Referring to FIG. 2, an exemplary embodiment 200 of a broadcast digital transmission (BDT) receiver 104 or 126 is depicted with a radio frequency (RF) front-end 202 coupled to a BDT receiver data processor 230 with software running either on a digital signal processor (DSP)/a microprocessor (µP) or hardwired on a field programmable gate array (FPGA)/an application-specific integrated circuit (ASIC) chip in accordance with the present invention. More specifically, an antenna 204 intercepts RF signals that come from a plurality of transmitters on the ground 140, in the air 144, and/or from the space 148. Captured signals are low-noise amplified (LNA) and bandpass-filtered (BPF) 206 and coupled to a RF to IF converter 208 with mixers. There may be several RF to IF down-conversion stages, each followed by an amplifier (AMP)/a bandpass filter (BPF) 210 in order to reach the desired gain and bandwidth while minimizing unwanted nonlinearity and interference effects. To drive the RF front-end 202, various frequency components 218$d$ are produced by a frequency synthesizer 212 driven in turn by, say, a temperature-compensated crystal oscillator (TCXO) 214, which is referred to as local clock 116 or 138. The frequency synthesizer 212 also produces a sampling clock 218$a$ to an analog to digital converter (ADC) 216 that samples and quantizes the IF signal and then passes the samples over for digital processing. The sampling rate should be sufficiently high to obtain an accurate representation of the BDT signal, as would be apparent to one skilled in the art. The frequency synthesizer 212 may also provide a clock 218$b$ to drive digital signal processing that follows. The frequency synthesizer 212 may be tuned via an instruction line 218$c$ to a desired center frequency of a particular broadcast digital transmission by a channels selector 220.

Still referring to FIG. 2, the incoming signal samples provided by an analog to digital converter 216 are first processed in a baseband signal processor 222 wherein the signals from transmitters chosen by the channels selector 220 are detected, acquired, and tracked. Features or events of broadcast signals that are common to cooperative receivers 102 and 124 are extracted and time-tagged according to the local clock 214 to produce a time of arrival (TOA) measurement 230. The TOA measurements 230 are then passed on to a cooperative position location processor 120 or 142 via a path 224 and to a data link transceiver 108 or 130 via a path 226. In return, a cooperative position location processor 120 or 142 sets up a channels selector 220 and a baseband signal processor 222 via a control path 228. Due to low duty factor, a baseband signal processor 222 operates on windowed data, thus easing throughput demand and saving power consumption. Details of the operations and interactions of a baseband signal processor 222 with others will be presented when describing subsequent figures.

The techniques for design and construction of antennas, RF front-end, data link modems, user interfaces, digital databases, and auxiliary sensors that possess the characteristics relevant to the present invention are well known to those of ordinary skill in the art.

As stated earlier, although the present invention is applicable to many broadcast digital transmissions, a preferred embodiment is described in this specification for the ATSC DTV signal. The current ATSC DTV signal is described in *ATSC Digital Television Standard (A/53), Revision E, with Amendment No. 1*, Dec. 27, 2005, with *Amendment No. 1* dated Apr. 18, 2006. The ATSC DTV signal uses the 8-ary Vestigial Sideband (8VSB) modulation and is organized into frames. Each frame has two fields, each field has 313 segments, and each segment has 832 symbols. The symbol rate is 10.762237 Mega-samples per second (Msps) and a symbol duration is 92.92 nanoseconds (ns), which is derived from a 27.000000 MHz clock. The segment rate is 12.935482 kilo-segments per second (ksps) and a segment duration is 77.307348 microseconds (µs). The field rate is 41.327096 fields per second and a field duration is 24.197200 milliseconds (ms). The frame rate is 20.663548 frames per second and the frame duration is 48.394400 (ms). There are a total of 260,416 symbols in a field and 520,832 symbols in a frame.

There are two types of segments, namely, field synchronization segment and data segment. Each segment starts with 4 symbols that are used for segment synchronization purpose (thus known as the segment sync code). There are two field synchronization segments in each frame, one for each field. Following each field synchronization segment are 312 data segments. The two field synchronization segments in a frame differ only to the extent that the middle set of 63 symbols are inverted in the second field synchronization segment.

The first 4 symbols of a data segment are 1, −1, −1, 1, which are known as segment sync code and used for segment synchronization. The other 828 symbols in a data segment are information-carrying that are randomized to be different from the segment sync code. Since the modulation is 8VSB, each symbol carries 3 bits of coded data using a rate ⅔ coding scheme. The 8VSB symbol values are −7 (000), −5 (001), −3 (010), −1 (011), 1 (100), 3 (101), 5 (110), 7 (111) before pilot insertion. A pilot is a carrier signal, which has −11.5 dB less in power than the data signal, and is used to aid coherent demodulation of the ATSC DTV signal. The symbol pulse has a raised-cosine waveform, which is constructed by filtering, as described in the book entitled, *Digital Communications* (3$^{rd}$ Ed.), by J. G. Proakis, McGraw-Hill, 1995.

The code sequence used as a feature or an event to be acquired and time-tagged by all cooperative receives can be any known digital sequence in the received signal. However, it is preferred to be repetitive with a reasonable periodicity. In a preferred embodiment with ATSC DTV signals, such DTV signal components as pilot, symbol clock, or even carrier could be used for timing and ranging purposes. However, the use of such signal components would produce inherent ambiguities due to their high repetition rate (or equivalently short wavelength). There are well-known techniques in the art to resolve such ambiguities but their use would entail additional complexity. A preferred code is therefore a repetitive synchronization code in an ATSC frame such as a field synchronization segment within an ASTC DTV frame or a segment synchronization symbol sequence within a data segment within an ATSC DTV frame or a combination of both. Pseudorandom DTV transmitter identification (TxID) watermark signals can also be used to serve the same purpose. However, the use of multiple wavelengths may be desired with the timing of field, segment, symbol, and pilot/carrier in the order from the coarsest wavelength to finest wavelength.

One of the most important tasks of a baseband signal processor 222 is to search and detect a code sequence embedded in a BDT signal sample stream, which is disclosed in the U.S. Pat. No. 7,388,541, entitled, Self-Calibrating Position Location Using Periodic Codes in Broadcast Digital Transmissions, by the present inventor, and is hereby incorporated into this specification by reference.

As part of its operations, the baseband signal processor 222 performs correlation between signal samples over data windows and a desired code sequence (called a code replica) for match. A preferred method for such correlation is disclosed in U.S. Pat. No. 7,471,241, entitled, Global Navigation Satellite System (GNSS) Receivers Based on Satellite Signal Channel Impulse Response, by the present inventor, issued Dec. 30, 2008. Another preferred method is the generalized frequency-domain correlation (GFDC) disclosed by the present inventor in the paper entitled "Symmetric Phase-Only Matched Filter (SPOMF) for Frequency-Domain Software GPS Receivers," in *ION Journal: Navigation*, Vol. 54, No. 1, Spring 2007, pp 31-42, which is incorporated into this specification by reference.

Figure 3:
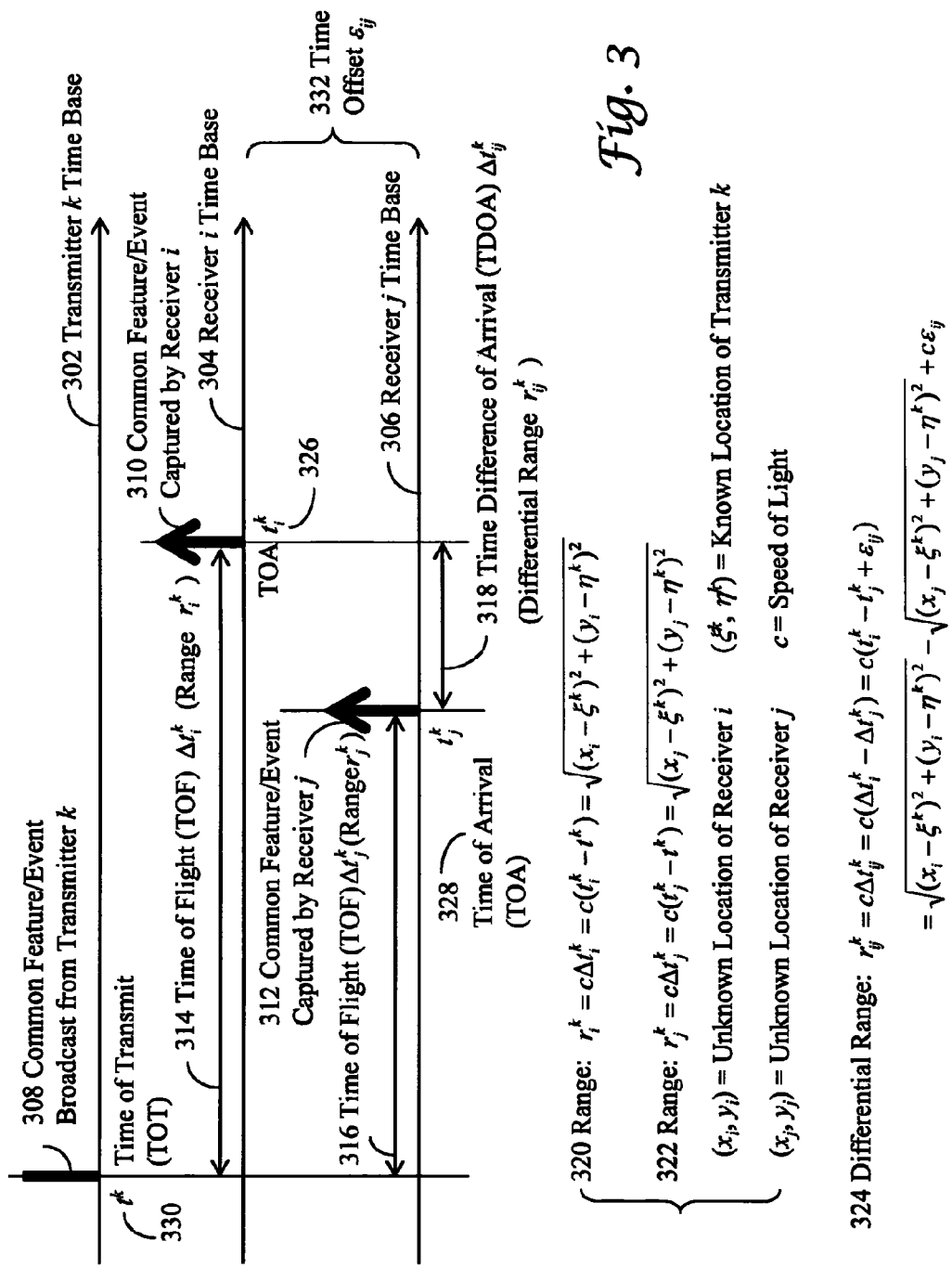
FIG. 3 is a drawing graphically illustrating the fundamental equations relating measured times of arrival and a time offset to a total time of flight and a differential time of flight, with which a known transmitter at a known location is tied to unknown cooperative user locations to be determined.

Referring to FIG. 3, the range equations 320 and 322 between an event of interest at transmission 308 and the same event at reception 310 and 312 are illustrated on the k-th transmitter's time base 302, the i-th receiver's time base 304, and the j-th transmitter's time base 306, respectively, in accordance with the present invention. In an embodiment, the leading edge of a field sync segment within an ATSC DTV frame is taken as an event of interest. The timing relationship between the event of interest at transmission 308 and the same event at reception 310 (and 312) is characterized by a time of flight (TOF) $\Delta t_i^k$ 314 (and $\Delta_j^k$ 316), which is calculated from the time of transmit (TOT) $t^k$ 330 and a time of arrival (TOA) $t_i^k$ 326 (and $t_j^k$ 328) relative to the i-th receiver's time base 304 (and to the j-th receiver's time base 306). The times of flight, $\Delta_i^k$ 314 and $\Delta_j^k$ 316, are then scaled into ranges, $r_i^k$ 320 and $r_j^k$ 322, by the speed of light, c. As a result, the times of flight, $\Delta_i^k$ and $\Delta_j^k$, are related to the k-th transmitter's location $(\xi^k, \eta^k)$ (which is known) and the i-th receiver's locations $(x_i, y_i)$ and the j-th receiver's location $(x_j, y_j)$, respectively (which both are unknown and are to be estimated).

However, the time of transmit $t^k$ 330 is not known. Besides, the transmitter's clock is subject to bias and drift due to frequency instability. Prior art techniques attempt to estimate the transmitter's clock drift by various means. In the present invention, the time of transmit $t^k$ 330 (and the transmitter's clock error) is removed by the technique of measurement differentiation. Referring back to FIG. 3, a time difference of arrival $\Delta t_{ij}^k$ 318 is formed between the i-th and j-th receivers from their respective times of arrival $t_i^k$ 326 and $t_j^k$ 328. However, a time offset $\epsilon_{ij}$ 332 may exist between time bases of cooperative receivers. This is translated into an error term in differential range $r_{ij}^k$ 324. Means to estimate time offset between cooperative receiver time bases and to communicate times of arrival of common events to each other will be described in connection with subsequent figures.

Figure 4:
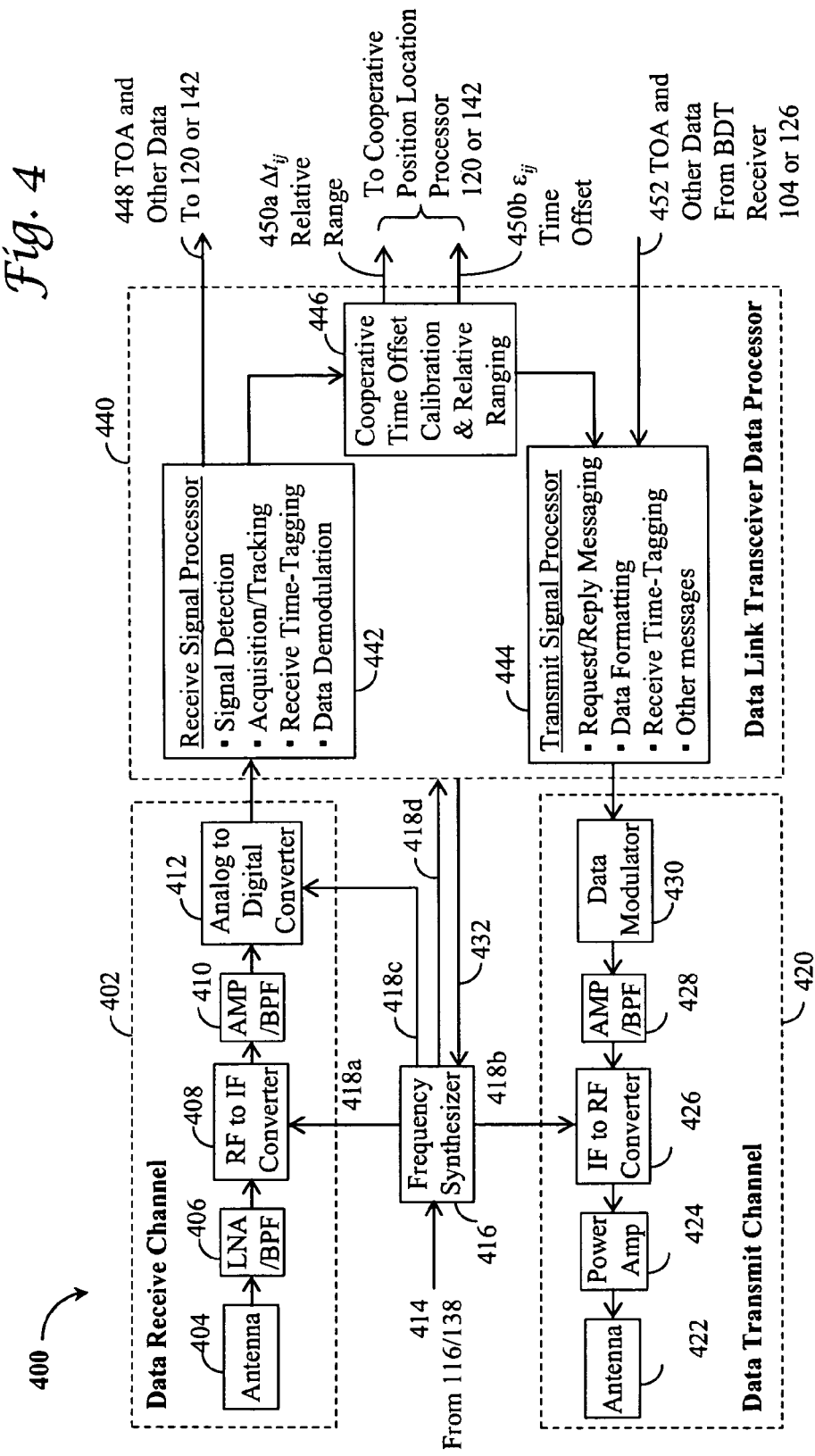
FIG. 4 is a schematic illustrating the architecture of an exemplary embodiment of a data link transceiver in accordance with the present invention.

Referring to FIG. 4, an exemplary embodiment 400 of a data link transceiver 108 or 130 is depicted with a data receive channel 402, a data transmit channel 420, and a data link transceiver data processor 440 in accordance with the present invention. The data receive channel 402 comprises an antenna 404, a low-noise amplifier (LNA) and a bandpass-filter (BPF) 406, several RF to IF down-conversion stages 408, each followed by an amplifier (AMP)/a bandpass filter (BPF) 410, and an analog to digital converter (ADC) 412. On the other hand, the data transmit channel 420 consists of a data modulator 430, several IF to RF up-conversion stages 426, each preceded by an amplifier (AMP)/a bandpass filter (BPF) 428, a power amplifier 424, and an antenna 422. To drive the data receive channel 402 and data transmit channel 422, various frequency components 418*a* and 418*b* are produced by a frequency synthesizer 416 driven in turn by a crystal oscillator 414 (from 116 or 138). The frequency synthesizer 416 also produces a sampling clock 418*c* and a clock 418*d* to drive digital signal processing that follows. The frequency synthesizer 416 may be tuned via an instruction line 432 to a desired center frequency for the data receive and transmit channels 402 and 420, respectively. The techniques for design and construction of data transceivers that possess the characteristics relevant to the present invention are well known to those of ordinary skill in the art.

Still referring to FIG. 4, a data link transceiver data processor 440 consists of a receive signal processor 442 and a transmit signal processor 444. The incoming signal samples provided by an analog to digital converter 412 are processed in a receive signal processor 442 wherein the signals from cooperative transceivers are detected, acquired, and tracked. Data bits and symbols of embedded messages are demodulated from the signals with their arrival times tagged in the local time. The demodulated messages include times of arrival 448 of common features of broadcast digital transmissions from common known transmitters at cooperative receivers. In a preferred protocol, it may also include transmit times of these very messages as they leaving cooperative receivers. As explained in FIG. 5, the demodulated transmit time of a message from a cooperative receiver and its arrival time in the local time tag are used by a cooperative time offset calibration and relative ranging block 446 to produce relative range $\Delta t_{ij}$ (or $r_{ij}$) 450*a* and time offset $\epsilon_{ij}$ 450*b*, which are then used by a cooperative position location processor 120 or 142.

Still referring to FIG. 4, the time of arrival of a common feature 452 from a BDT receiver 104 or 126 is passed on to a transmit signal processor 444. It formulates request and reply messages and converts times of arrival and time tags into proper formats according to a communications protocol before sending them to a data modulator 430 for transmission.

Figure 5:
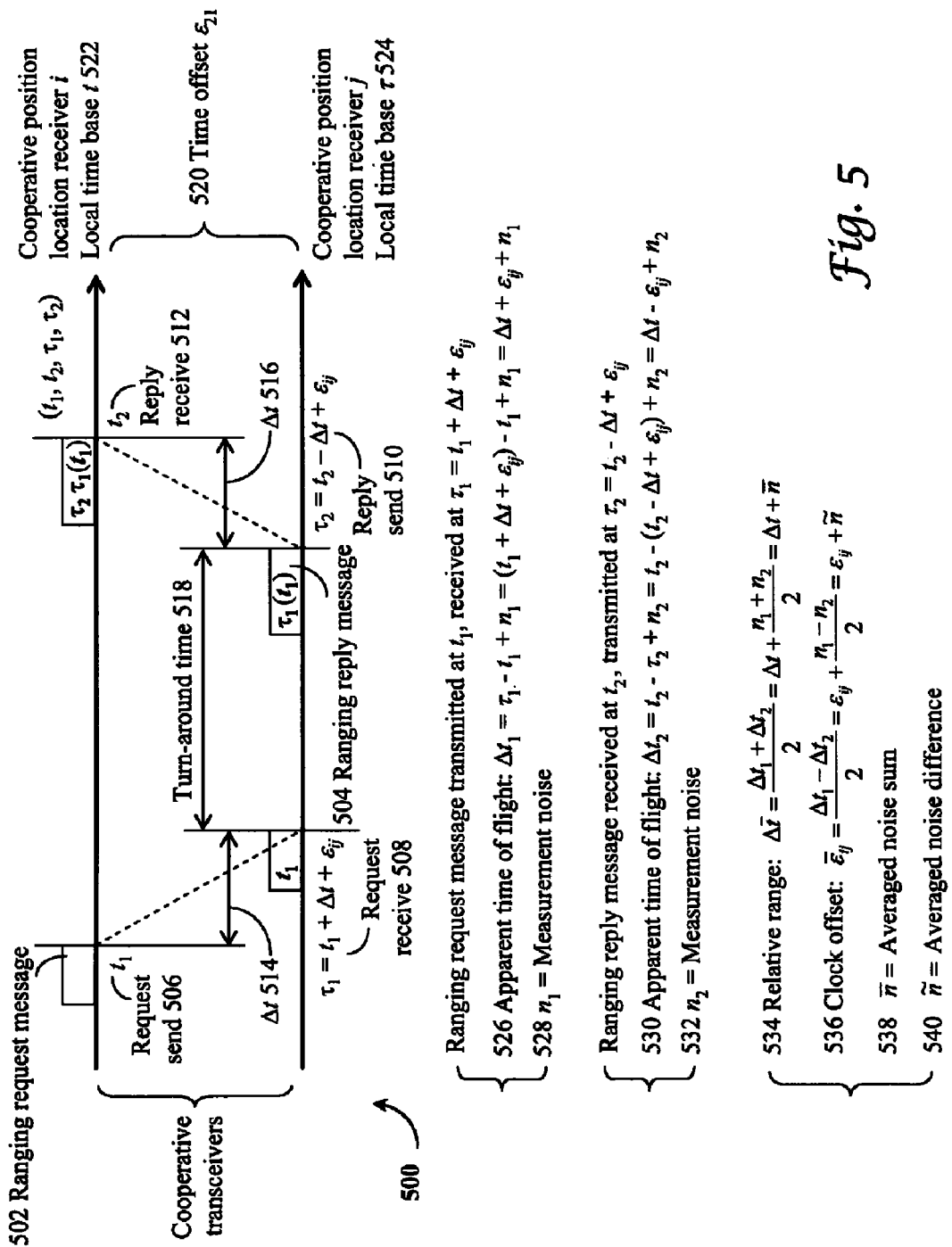
FIG. 5 is a drawing graphically illustrating the fundamental equations relating time stamps of ranging messages (request send, request receive, reply send, reply receive) to a relative range and a clock offset between two cooperative transceivers.

Referring to FIG. 5, an exemplary embodiment 500 of a clock offset calibration and relative ranging block 446 between two cooperative transceivers via a data link 122 (in addition to data exchanges) is illustrated in accordance with the present invention. This not only allows the cooperative transceivers to choose the most appropriate positioning mechanism but also provides them with additional measurements so as to eliminate the undesired dependency on a large number of broadcast digital transmissions that may not be available in a less populated area. The cooperative clock offset calibration and relative ranging is accomplished via the exchange of ranging request message 502 and ranging reply message 504. As shown, the i-th transceiver sends out a ranging request message 502. The leading edge of the message is time-tagged and the time-tag $t_1$ 506 is immediately embedded into the same message (request send $t_1$ 506). The message may also include time tags of selected features of broadcast digital transmissions it has captured. The j-th transceiver, which is ready to cooperate, will reply. But it first time-tags the request message when it arrives (request receive $\tau_1$ 508). After a certain turn-around time 518, it will send a reply message (reply send $\tau_2$ 510). The reply message will include not only the time tags of request receive $\tau_1$ 508 and reply send $\tau_2$ 510 (and request send $t_1$ 506 optionally) but also the time tags of selected features of broadcast digital transmissions it has captured. The reply message is again time-tagged when it reaches back the initiating transceiver (reply receive $t_2$ (512)).

The time tags of selected features of broadcast digital transmissions are used to form measurements of time difference of arrival (scaled into differential range measurements by the speed of light plus certain corrections) to common sources as illustrated in FIG. 3. At the same time, the time tags of request send, request receive, reply send, and reply receive are used to estimate the clock offset between the two cooperative receivers. The various events are time-tagged relative to local time bases t 522 and τ 524, respectively, which differ by a time offset $\epsilon_{ij}$ 520.

Still referring to FIG. 5, the ranging request message is transmitted at $t_1$ 506 and received at $\tau_1$ 508. Their difference yields the apparent time of flight $\Delta t_1$ 526, which consists of the true time of flight $\Delta t$ 514, the clock offset $\epsilon_{ij}$ 520, and measurement noise $n_1$ 528. Similarly, the ranging reply message is transmitted at $\tau_2$ 510 and received at $t_2$ 512. Their difference yields the apparent time of flight $\Delta t_2$ 530, which consists of the true time of flight $\Delta t$ 516, the clock offset $\epsilon_{ij}$ 520, and measurement noise $n_2$ 532.

Referring to FIG. 5 again, the relative range between the two cooperative transceivers is calculated as the round-trip average $\overline{\Delta t}$ 534, which will not only eliminate the clock bias $\epsilon_{ij}$ 520 but also reduce the random noise by average. That is, the average noise sum $\bar{n}$ 538 has a smaller variance. Similarly, the clock offset between the two time bases is calculated as the average difference $\overline{\epsilon}_{ij}$ 536, which will also reduce the random noise by average. That is, the average noise difference $\tilde{n}$ 540 has a smaller variance.

To implement the clock offset calibration and relative ranging mechanism as depicted in FIG. 5 for a plurality of cooperative users, it requires the wireless data links to be capable of multiple access using either time division, code division, frequency division or a combination thereof. In addition, protocols are required to specify actions taken at cooperative transceivers so as to transform time of arrival (TOA) information into time of flight (TOF) and range estimate for ultimate positioning. One example of such protocols is the IEEE 802.15.4a Wireless Personal Area Network (WPAN) standard that is intended for the creation of a physical layer for short-range and low-data rate communications and for precise localization with ultra wideband (UWB) radios. Instead of embedding transmit time tags into ranging request/reply messages (as in GPS navigation messages), separate messages can be sent that carry transmit and receive time tags together with turn-around times and internal propagation delay and other protocol-related delay errors. In this case, each cooperative device acts like a transponder echoing back a ranging request/reply message immediately. Other time-based ranging protocols exist to implement the relative ranging and clock offset calibration as illustrated in FIG. 5. Examples include two-way time of arrival based ranging protocol (TW-TOA), differential two-way time of arrival ranging protocol (DTW-TOA), and symmetric double-sided ranging protocol (SDS) to name a few. This and other techniques are described in the book entitled *Ultra-Wideband Positioning Systems: Theoretical Limits, Ranging Algorithms, and Protocols*, by Zafer Sahinoglu, Sinan Gezici, and Ismail Guvenc, Cambridge University Press 2008 (ISBN 978-0-521-87309-3), which is incorporated into the present specification by reference.

A host of techniques have been set forth recently for wireless network-based positioning. It typically relies on anchor nodes at known locations. A mobile node measures its ranges to several anchor nodes via times of arrival (TOA) and/or time differences of arrival (TDOA) through various communication protocols and finally determines its location by multilateration. The present invention differs from such wireless network-based positioning techniques significantly. First, all cooperative nodes in the present invention are at unknown locations (i.e., no anchor nodes), which are what to be estimated. Of course, the problem is greatly simplified if any of the nodes are known. Second, those sources at known location (i.e., broadcast digital transmitters) in the present invention are not "correspondent" in the sense that ranges to these known transmitters have to be estimated using a method other than two-way communications.

For the two-dimensional case considered in FIG. 3, there are four unknowns for two cooperative transceivers (i.e., ($x_i$, $y_i$) and ($x_j$, $y_j$)) assuming that the clock offset between the two receivers (i.e., $\epsilon_{ij}$) can be satisfactorily calibrated. Then, the differential range $r_{ij}^k$ 324 and the relative range $r_{ij}$ 534 only provide two equations, which are insufficient to solve for the four unknowns. Each additional BDT source will bring an extra range equation. At least three independent BDT sources are therefore required to provide an initial position location, as shown in the second column 602 of the table 600 depicted in FIG. 6.

However, there may not be enough number of independent BDT transmitters with a good geometrical distribution in practical situations, particularly in less populated areas. The difficulty is circumvented for mobile users if their displacement can be measured. Referring to FIG. 6, the third column 604 indicates that only two independent BDT sources are needed to solve for the unknowns if at least one of the cooperative users makes a displacement that can be accurately measured. Similarly, the fifth column 606 of FIG. 6 provides a general formula 608 relating the number of displacements (m) needed for one or two of the cooperative users (l) to make as a function of the number of independent BDT sources (n).

Figure 7:
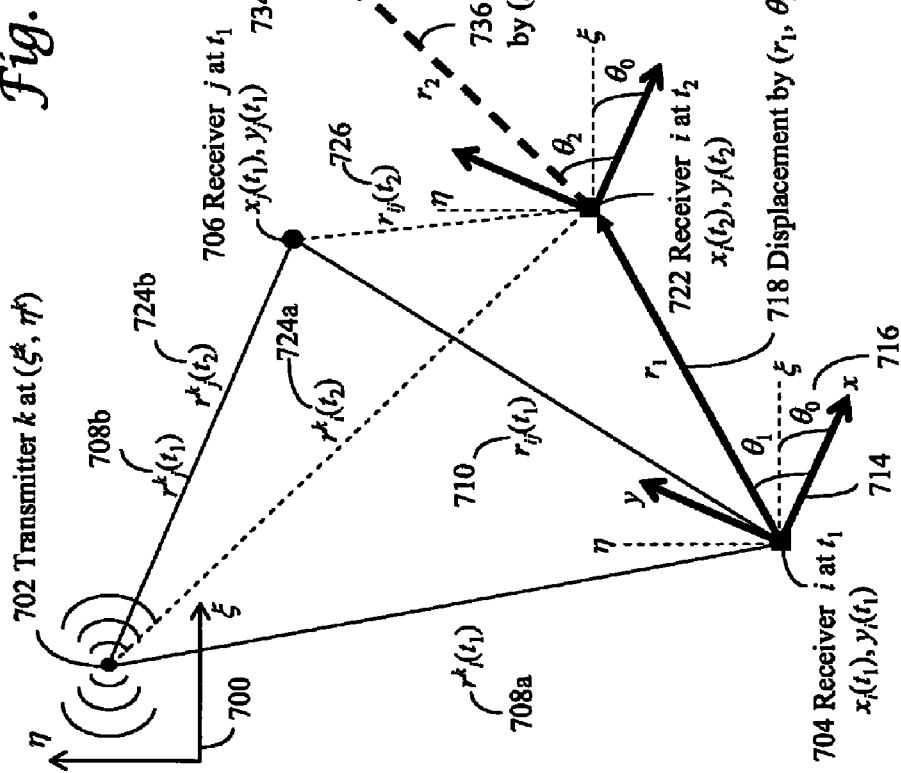
FIG. 7 is a drawing graphically illustrating the procedure of making displacement to a different location and accumulating differential and relative range measurements at the location in accordance with the present invention.

Referring to FIG. 7, cooperative position location via wireless data link using broadcast digital transmissions is illustrated for a two-dimensional case in accordance with the present invention. A BDT source k 702 is at a known location ($\xi^k$, $\eta^k$), referenced to a common coordinate frame ξ-η 700. At time $t_1$, the two cooperative receivers i and j are at unknown locations ($x_i(t_1)$, $y_i(t_1)$) 704 and ($x_j(t_1)$, $y_j(t_1)$) 706, which we want to determine. At this time, the differential range $r_{ij}^k(t_1)$ 712 calculated from $r_i^k(t_1)$ 708a and $r_j^k(t_1)$ 708b according to the method 324 and the relative range $r_{ij}(t_1)$ 710 according to the method 534 are available but they are insufficient to solve the problem.

Still referring to FIG. 7, receiver j 706 is assumed to be stationary whereas receiver i 704 is to move. Consider a general case wherein receiver i 704 can only measure its displacement ($r_1$, $\theta_1$) 718 relative to a local coordinate frame x-y 714. Further, receiver i can track the change of its local frame relative to the common coordinate frame ξ-η 700 except for its initial orientation $\theta_0$ 716, which is however unknown. This leads to a set of five unknowns ($x_i(t_1)$, $y_i(t_1)$, $x_j(t_1)$, $y_j(t_1)$, $\theta_0$) 720 to solve for.

Still referring to FIG. 7, at time $t_2$, after the first displacement ($r_1$, $\theta_1$) 718, receiver i is at ($x_i(t_2)$, $y_i(t_2)$) 722. The differential range $r_{ij}^k(t_2)$ 728 is calculated from $r_i^k(t^2)$ 724a and $r_j^k(t_2)$ 724b according to the method 324 and the relative range $r_{ij}(t_2)$ 726 according to the method 534 are available. Since the unknown location at time $t_2$ ($x_i(t_2)$, $y_i(t_2)$) 722 can be related to the initial unknown location at time $t_1$ ($x_i(t_1)$, $y_i(t_1)$) 704 via equation 730 where the displacement vector is calculated via equation 732. There are four measurements but they are still insufficient to solve the problem.

Referring to FIG. 7 again, after another displacement ($r_2$, $\theta_2$) 736, receiver i reaches at ($x_i(t_3)$, $y_i(t_3)$) 734. At time $t_3$, two more measurements are available and they are the differential range $r_{ij}^k(t_3)$ 738 and the relative range $r_{ij}(t_3)$ 740. Since the unknown location at time $t_3$ ($x_i(t_3)$, $y_i(t_3)$) 734 can be related to the initial unknown location at time $t_1$ ($x_i(t_1)$, $y_i(t_1)$) 704, then after two displacements and taking measurements at three separated locations, there are six measurements and they are sufficient now to solve for the five unknowns ($x_i(t_1)$, $y_i(t_1)$, $x_j(t_1)$, $y_j(t_1)$, $\theta_0$) 720.

Measuring displacements (i.e., distance travelled and orientation turned) in one's own frame is a form of dead-reckoning. For example, an inertial measurement unit (IMU) has a three-axis accelerometer assembly to measure accelerations and a three-axis gyro assembly to measure rotation rates. The IMU outputs are integrated over time in an inertial navigation system (INS) to produce an inertial solution (position and attitude). To curb its ever-growing errors, an INS solution needs to be frequently updated by a navigational aid (navaid) such as the Global Positioning System (GPS). However, the integration of differential and relative ranges with displacements in the present invention significantly differs from conventional integrations such as GPS/INS in two major aspects. First, conventional dead-reckoning adds up displacements forward from a given initial condition, which is however unknown and is to be estimated in the present invention. Second, the integration of all measurements in the present invention is done at the initial point, leading to a fixed-point smoother whereas a Kalman filter is typically used for conventional GPS/INS integration. As a matter of fact, the present invention offers an alternative approach that can be used to integrate an INS with other navaids such as GPS without the need for precise initialization otherwise required for conventional inertial solution.

Once the initial point is determined, the displacements are integrated forward from the initial point to yield a solution trajectory. This processing procedure is somewhat similar to satellite orbit determination. However, in orbit determination, the displacements are numerically integrated from precise mathematical models of the geopotential and other perturbation force fields.

Figure 8:
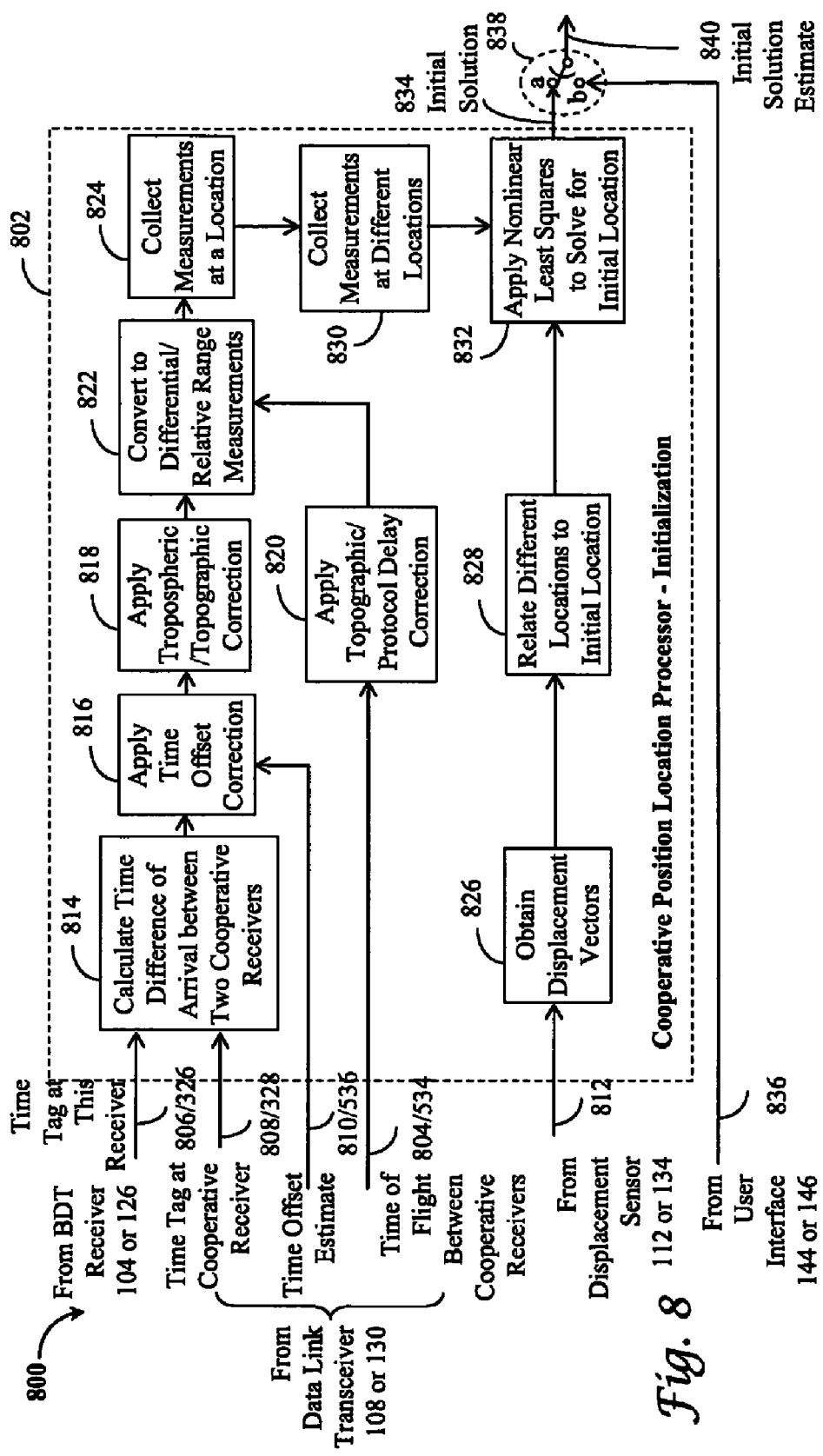
FIG. 8 is a schematic illustrating an exemplary embodiment of method steps of initialization using measured times of arrival from a plurality of transmitters, times of flight between cooperative receivers, and a sequence of displacement vectors in accordance with the present invention.

Referring to FIG. 8, an exemplary embodiment 800 of an initialization step 802 of a cooperative position location processor 120 or 142 is illustrated in accordance with the present invention. A data link transceiver 108 or 130 provides a time of flight between two cooperative receivers 804 (or 534), a time offset estimate 810 (or 536), and a time tag of a common event of BDT at another cooperative receiver 808 (or 328). At the same time, a BDT receiver 104 or 126 of this receiver provides a time tag of the same event at this receiver 806 (or 326). The time tag of a common event of BDT at this receiver 806 and the time tag of the same event at the other cooperative receiver 808 are used to calculate a time difference of arrival between the two cooperative receivers 814. A time offset estimate 810 is used to apply time offset correction 816. A next step is to apply tropospheric/topographic correction 818. This is because the speed of a radio signal changes when propagating through media as a function of weather conditions, e.g., air temperature, atmospheric pressure, and humidity. The weather information in the vicinity of a BDT receiver can be obtained via an online/onboard database 114 or 136 from the Internet or other sources such as National Oceanic and Atmospheric Administration (NOAA), from which the actual propagation velocity can be determined. Furthermore, radio geolocation with terrestrial transmitters is better suited for two-dimensional latitude/longitude position location because the vertical dimension (i.e., height above the ground) of transmitters is rather small compared to horizontal dimensions. In terrains with hills and valleys relative to a transmitter antenna's phase center, a user may not lie on the circle of constant range around a transmitter if the user has a different altitude even though its line of sight distance to the transmitter is the same as the circle radius. In this case, a terrain topographic map can be used to compensate for the effect of user altitude on the surface of the earth. Optionally, an altimeter or a barometer can be used to obtain an estimate of (differential) altitude. For the same reason, a next step is to apply topographic, protocol related, and internal circuitry propagation errors correction 820 to a time of flight 804. These time tags are converted into differential and relative range measurements 822, which are collected at a location 824 and then cumulated at multiple locations 830.

Still referring to FIG. 8, a simultaneous step is to obtain displacement vectors 826 from a displacement sensor 812 (112 or 134). A next step is to relate displacement 812 from different locations to an initial location 828. A final step of initialization 802 is to apply a nonlinear least squares method to the collected measurements 830 and their relationships to the initial location 828 to solve for initial location 832 to afford an initial solution 834. Alternatively, an initial solution estimate 840 can be obtained from a user interface 836 (144 or 146) via a selection switch 838. A direct search can be used to solve the nonlinear least squares formulation to obtain an initial estimate. A preferred Nelder-Mead simplex method, disclosed in the paper entitled "A Simplex Method for Function Minimization," by J. A. Nelder and R. Mead in *Computer Journal*, 7 (1965), 308-313, is incorporated into this specification by reference.

A magnetic compass and a tape measure can serve as a rudimentary displacement sensor. The magnetic compass determines the direction of travel relative to the magnetic north while the tape measure indicates the distance travelled, thus providing a displacement vector. So long as the displacement is large in magnitude as compared to errors in differential and relative range measurements, it can help solving the positioning equations provided that the line of sight (LOS) vectors are sufficiently moved, thus affording a good geometry. For a four-wheeled ground vehicle when not skidding, the average of all wheel speeds from its antilock break system (ABS) provides an estimate of the speed, which is integrated over time to provide the distance traveled. On the other hand, the scaled difference between the pairs of left and right wheel speeds provides an estimate of the turning rate, which is integrated into the heading change (yaw). Together the two measurements provide an estimate of relative velocity vector, which is integrated into a displacement vector. Inertial sensors such as accelerometers and gyros can also be mechanized to provide displacements as disclosed in the previously mentioned U.S. Pat. No. 7,388,541 by the present inventor.

Figure 9:
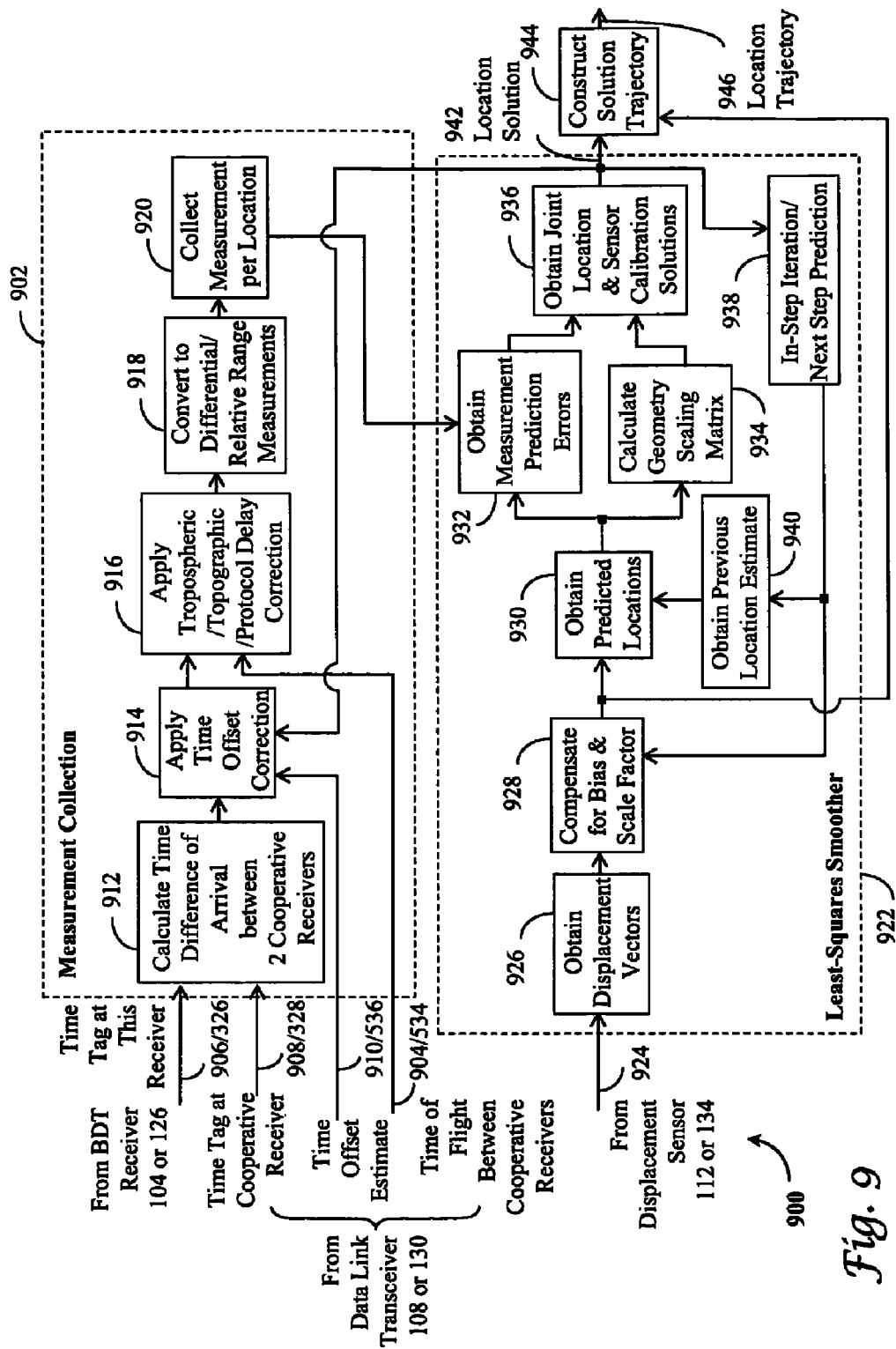
FIG. 9 is a schematic illustrating an exemplary embodiment of method steps to jointly determine a time offset and a trajectory of position locations using measured times of arrival from a plurality of transmitters, times of flight between cooperative receivers, and a sequence of displacement vectors in accordance with the present invention.

Referring to FIG. 9, an exemplary embodiment 900 of a cooperative position location processor is illustrated for continuous processing after initialization in accordance with the present invention. Similar to the initialization step 802 in FIG. 8, a data link transceiver 108 or 130 provides a time of flight between two cooperative receivers 904 (or 534), a time offset estimate 910 (or 536), and a time tag of a common event of BDT at another cooperative receiver 908 (or 328). A time tag of the same event at this receiver 906 (or 326) is provided by a BDT receiver 104 or 126. A first step of measurement collection 902 is to calculate time difference of arrival between two cooperative receivers 912 from the time tag of a common event of BDT at this receiver 906 and the time tag of the same event at another cooperative receiver 908. The time offset estimate 910 is used to apply time offset correction 914 initially. A next step is to apply tropospheric/topographic/protocol delay correction 916 to both time of flight 904 and time difference of arrival after time offset correction 914. These time tags are converted into differential and relative range measurements 918, which are collected per location 920.

Still referring to FIG. 9, a simultaneous step is to obtain displacement vectors 926 from a displacement sensor 112 or 134. A next step is to compensate for bias and scale factor 928 of displacement measurements 924. Given an initial solution 940 (840) and compensated displacements from 928, a next step is to obtain predicted locations 930, from which to calculate a geometry scaling matrix 934 on the one hand and to obtain differential and relative range measurement prediction errors 932 on the other hand. A next step is to obtain a joint location and sensor calibration solution 936 from measurement prediction errors 932 and a geometry scaling matrix 934. Due to nonlinear nature, a next step is to make several in-step iterations or to calculate next-step prediction 938. The joint estimates of location errors and sensor calibrations 942 are used to correct previous estimates to obtain improved locations for next step 940, to compensate for displacement sensor errors 928, and to apply time offset correction 914 in a refined manner. The exemplary scheme 922 for joint position location and sensor calibration in FIG. 9 can be understood as a least squares fixed-point smoother wherein all displacement vectors are brought back to the initial point and a batch processing is applied. An alternative joint position location and calibration scheme is to use sequential processing.

Referring to FIG. 9 again, the compensated displacement measurements 928 and the location solution 942 are finally used to construct a solution trajectory 944 to yield a location trajectory over time 946. The techniques for design and construction of a least-squares fixed-point smoother or a sequential processing Kalman filter that possesses the characteristics relevant to the present invention are well known to those of ordinary skill in the art. In particular, the ridge regression technique may be used to alleviate rank-deficiency in the geometry scaling matrix if occurred.

Although the description above contains much specificities, these should not be construed as limiting the scope of the invention but as merely providing illustrations of some of the presently preferred embodiments of this invention. For example, the present invention provides a generic signal processing architecture of versatility where many processing steps can be tailored to achieve a desired combination of functionalities. As a result, some steps may be made optional and others are omitted. Flexibility is also provided for design parameters tradeoff to best suit a particular application. As a preferred method, a least-squares smoother detailed in this specification may be substituted with such nonlinear estimators as an unscented Kalman smoother, a particle smoother, and a variant thereof for the same purposes. These filters and smoothers may be replaced by numerical methods of direct search such as the Nelder-Mead simplex method mentioned earlier. A constant bias and scale factor are modeled in the error state vector for time offset and displacement sensor errors in the exemplary joint estimation formulation of this specification. It is possible to account for higher order effects by including such terms as drift in the error state.

Reference has been made mostly to digital television signals but the present invention is equally applicable to broadcast digital radio/audio signals, wireless local area network (WLAN) and wireless personal area network (WPAN), other broadcast digital transmissions in general, and even partially available GPS signals. One example is the high power, low frequency radio signal broadcast by the National Institute of Standards and Technology (NIST) WWVB station near Ft. Collins, Colo., that has been used by millions of people throughout North America to synchronize consumer electronic products like wall clocks, clock radios, and wristwatches.

As a preferred embodiment, the use of range measurements is described in detail in the present specification. However, other measurements such as angles of arrival (AOA) can be used instead. Similarly, visual odometers (via optical flow for instance) can be used to construct a displacement sensor in a personal dead-reckoning system. Although the drawings as presented in this specification are two-dimensional for the sake of simple and clear presentation, it can be easily generalized to three-dimensional cases. Furthermore, the cooperative mechanism is described in the present invention for position location. It can however be used for joint sensor location and target tracking as well as for cooperative simultaneous location and mapping (CSLAM).

It is understood that the various figures described above illustrated only the preferred embodiments of the present invention system and method. A person skilled in the art can therefore make numerous alterations and modifications to the described embodiments utilizing functionally equivalent components and method steps to those shown and described. All such modifications are intended to be included within the scope of the present invention as defined by the appended claims.

What is claimed is:

1. A method of determining the location of a plurality of mobile users in an area using existing digital signals of opportunity transmitted from a plurality of transmitters proximate said area, said method comprising the steps of:

providing each of said plurality of mobile users with a displacement sensor that detect displacements incurred within said area as said plurality of mobile users move through said area, therein producing displacement measurements;

establishing a communications link between each of said plurality of mobile users, wherein each of said plurality of mobile users receives said digital signals of opportunity from each of said transmitters at different times, and wherein said different times are communicated among said plurality of mobile users using said communications link to determine time difference of arrival measurements;

utilizing said time different of arrival measurements to form a compensated differential range measurement between at least two of said mobile users and at least one of said transmitters;

forming a corrected relative range measurement between at least two of said mobile users using said communications link;

transforming said compensated differential range measurement, said corrected relative range measurement collected, and said displacement measurements into a location for at least one of said mobile users; and determining a position location for each of said mobile users utilizing said differential range measurements, said corrected relative range measurements, and said displacement measurements.

2. The method according to claim 1, wherein said transmitters are selected from a group consisting of surface transmitters, airborne transmitters, and satellite transmitters.

3. The method according to claim 1, wherein said digital signals of opportunity are broadcast digital transmissions, each containing a known periodic code selected from a set comprising a synchronization code embedded in said broadcast digital transmissions and a modulated pseudonoise sequence superimposed onto said broadcast digital multimedia signals.

4. The method according to claim 3, wherein said step of forming a compensated differential range measurement between at least two of said mobile users and at least one of said transmitters, further includes the substeps of:

receiving said broadcast digital transmissions from at least one of said transmitters by at least two of said mobile users;

providing a local time base at each of said mobile users;

determining a measured time of arrival of said known periodic code at said mobile users relative to said local time base of said cooperative devices; and generating said compensated differential range measurement between at least two of said mobile users from said time of arrival from at least one of said transmitters.

5. The method according to claim 4, wherein said step of generating said compensated differential range measurement between at least two of said mobile users from said time of arrival from at least one of said transmitters, further includes the substeps of:

exchanging said time of arrival of a same known periodic code from at least one of said transmitters between said mobile users via said communications link;

generating a differential time of arrival by subtracting said measured time of arrival of one of said mobile users from another of said mobile users; and applying compensations to said differential time of arrival, yielding said compensated differential range measurement.

6. The method according to claim 5, wherein said step of applying compensations to said differential time of arrival, further includes the substeps of:

obtaining a clock offset estimate between said time bases of said mobile users;

obtaining a correction of line of sight distance for topographic distortion caused by terrain elevation in a vicinity of said mobile users;

obtaining an atmospheric propagation velocity of light according to weather conditions in a vicinity of said mobile users;

applying said clock offset estimate to said differential time of arrival, scaling clock offset-compensated differential time of arrival by said atmospheric propagation velocity of light; and applying said correction of line of sight distance for topographic distortion.

7. The method according to claim 4, wherein said step of receiving broadcast digital transmissions, further includes the substeps of:

obtaining a center frequency from a channel selector for each of said transmitters;

tuning a local oscillator to down-convert said broadcast digital transmissions from said center frequency to a predetermined intermediate frequency signal;

applying stages of mixing, bandpass filtering and amplification to said intermediate frequency signal; and digitizing said intermediate frequency signal, yielding received incoming signal time samples of said broadcast digital transmissions.

8. The method according to claim 4, wherein said step of determining a measured time of arrival, further includes the substeps of:

maintaining lock onto said known periodic code of said transmitters;

determining a direct correlation peak pertaining to each of said transmitters; and interpolating for a refined location of said direct correlation peak, yielding said measured time of arrival.

9. The method according to claim 8, wherein said step of maintaining lock onto said known periodic code of said transmitters, further includes the substeps of:

obtaining an initial estimate of timing and frequency errors of said periodic code and said center frequency via search over a time and frequency uncertainty interval;

creating a local replica of said periodic code at said timing estimate and a local carrier at said center frequency estimate via a code and carrier generator;

performing correlation between said incoming signal samples and said local replicas at said timing and frequency estimates;

applying a code delay discriminator, a carrier phase discriminator and a frequency error discriminator to said correlation, yielding a code delay error, a carrier phase error and a frequency error;

processing said code delay error, said carrier phase error and said frequency error through a code tracking filter and a carrier tracking filter; and sending an output of said tracking filter to said code and carrier generator, therein closing a code feedback loop and a carrier feedback loop, therein maintaining lock onto said known periodic code of said transmitters.

10. The method according to claim 1, wherein said step of forming a corrected relative range measurement, further includes the substeps of:

obtaining an apparent time of flight of a ranging message for request;

obtaining an apparent time of flight of a ranging message for reply;

scaling an average of times of flight of said ranging messages for request and reply by the speed of propagation, yielding an apparent relative range between mobile users;

scaling a difference between times of flight of said ranging messages for request and reply by a factor of two, yielding an estimate of clock offset between said mobile users; and applying delay corrections to said apparent relative range, yielding said corrected relative range measurement, wherein said delay corrections are selected from a group consisting of atmospheric, topographic, protocol-related, and circuitry propagation.

11. The method according to claim 10, wherein said step of obtaining an apparent time of flight of a ranging message, further includes the substeps of:

forming a ranging message at an initiating device;

broadcasting said ranging message to said mobile users;

obtaining a send time tag of said ranging message leaving said initiating device;

obtaining a receive time tag of said ranging message arriving at said mobile users;

exchanging said send and receive time tags of said ranging message between said initiating device and said mobile users; and subtracting said send time tag from said receive time tag, yielding said apparent time of flight of a ranging message.

12. The method according to claim 11, wherein said step of broadcasting said ranging message, further includes the substeps of:

formatting said ranging message in accordance with a predefined ranging and a communication protocol;

modulating formatted ranging message onto a carrier;
applying stages of mixing, bandpass filtering and amplification to said carrier, therein up-converting said modulated carrier to a predetermined radio frequency signal; and
sending said radio frequency signal to an antenna, therein broadcasting said ranging message.

13. The method according to claim 11, wherein said step of obtaining a receive time tag, further includes the substeps of:
receiving incoming signal samples of said ranging message;
providing a local time base;
maintaining lock onto said ranging message; and
determining a time of arrival of said ranging message relative to said local time base, therein yielding said receive time tag of said ranging message.

14. The method according to claim 13, wherein said step of receiving incoming signal samples of said ranging message, further includes the substeps of:
obtaining a center frequency for said initiating device;
tuning a local oscillator to down-convert said broadcast ranging message from said center frequency to a predetermined intermediate frequency signal;
applying stages of mixing, bandpass filtering and amplification to said intermediate frequency signal; and
digitizing said intermediate frequency signal, yielding said incoming signal time samples.

15. The method according to claim 13, wherein said step of maintaining lock onto said ranging message, further includes the substeps of:
obtaining an initial estimate of timing and frequency errors of said ranging message and said center frequency via search over a time and frequency uncertainty interval;
creating a local replica of said ranging message at said timing estimate and a local carrier at said center frequency estimate via a code and carrier generator;
performing correlation between said incoming signal samples and said local replicas at said timing and frequency estimates;
determining a direct correlation peak pertaining to said ranging message;
interpolating for a refined location of said direct correlation peak, therein yielding said measured time of arrival of said ranging message code;
applying a code delay error discriminator, a carrier phase error discriminator and a frequency error discriminator to said correlation, therein yielding a code delay error, a carrier phase error and a frequency error;
processing said code delay error, said carrier phase error and said frequency error through a code tracking filter and a carrier tracking filter to obtain a filtered output; and
sending said filtered output to said code and carrier generator, therein closing a code feedback loop and a carrier feedback loop, thus maintaining lock onto said ranging message.

16. The method according to claim 11, wherein said send and receive time tags of said ranging message between said initiating device and said cooperative devices can be exchanged using a procedure selected from a set of directly embedding time tags into ranging messages and sending time tags in separate data-only messages in accordance with a predefined protocol.

17. The method according to claim 16, wherein said separate data only messages may further contain time tags for send and receive of ranging messages, time tags for arrival of broadcast digital transmissions, and circuit propagation delay and protocol-related delay calibration and correction data.

18. The method according to claim 1, wherein said step of transforming said differential range measurement and said relative range measurement collected at a number of known displacements of at least one of said cooperative devices, further includes the substeps of:
selecting a point of interest at which to determine a location solution for each of said mobile users in a common coordinate frame;
collecting said differential range measurement and relative range measurement at said point of interest;
making at least one displacement by at least one of said mobile users if the number of collected differential and relative range measurements is not sufficient for location solution;
accumulating said differential range measurement and said relative range measurement at each of said displacement point; and
relating said differential range measurement and said relative range measurement collected at said displacements to said point of interest.

19. The method according to claim 18, wherein said step of relating said differential range measurement and said relative range measurement collected at said displacements to said point of interest, further includes the substeps of:
obtaining a displacement vector in terms of distance traveled and orientation changed during said displacement; and
expressing a displacement location in terms of said unknown point of interest and known displacement vector in said common coordinate frame, therein relating said differential range measurement and said relative range measurement collected at said displacements to said point of interest.

20. The method according to claim 19, wherein said displacement vector is selected from a group of sensors consisting of at least an inertial measurement unit mechanized relative to said point of interest, an automotive dead reckoning system, an indoor dead reckoning system, and a personal dead-reckoning system.

21. The method according to claim 1, wherein said step of determining a position location of each of said cooperative devices at said point of interest, further includes the substeps of:
obtaining an initial estimate of said position location of each of said mobile users at said point of interest;
obtaining a prediction error of said differential and relative range measurements of said mobile users to said transmitters;
obtaining a geometry scaling matrix for said differential and relative range measurements;
obtaining an estimate of position location error and an estimate of sensor errors by applying a least-squares fixed-point smoother based on said geometry scaling matrix with said differential and relative range measurements; and
adding said estimate of location error to said initial estimate of position location, therein yielding said position location of each of said mobile users at said point of interest.

22. The method according to claim 21, wherein said initial estimate of said position location is obtained from a group of steps comprising at least directly solving nonlinear range equations, applying an iterative solution to nonlinear range equations, and receiving initialization data from a user interface.

23. The method according to claim 21, wherein said step of obtaining a prediction error of said differential and relative range measurements of said mobile users, further includes the substeps of:

obtaining predicted differential and relative ranges based on said initial estimate of position location of mobile users, said initial estimate of sensor errors, and location of said transmitters; and subtracting said predicted differential and relative ranges from said measured differential and relative range measurements, therein yielding said prediction error of said differential and relative range measurements, wherein said prediction error is arranged into a vector of range prediction errors.

24. The method according to claim 21, wherein said step of obtaining a geometry scaling matrix for said differential and relative range measurements, further includes the substeps of:

taking partial derivatives of said differential and relative range measurements with respect to each of said position location and sensor error variables; and arranging said partial derivatives into said geometry scaling matrix.

25. The method according to claim 21, wherein said step of determining a position location of each of said mobile users at said point of interest and said displacement points, further includes the substeps of:

applying said estimate of sensor errors to said displacement measurements, thereby generating error-compensated displacements, and adding said error-compensated displacements to said estimate of position location at said point of interest, yielding said position location of each of said cooperative devices at said point of interest and said displacement points.

26. A system for determining the position of a plurality of cooperative users, comprising:

a plurality of transmitters that broadcast digital transmissions, wherein each of said digital transmissions embeds at least a known periodic code;

a broadcast digital transmission receiver that keeps a time base and determines a measured time of arrival of said known periodic code in a broadcast digital transmission relative to said time base;

a data link transceiver that keeps a time base, sends and receives ranging messages, determines a send and receive time of said ranging messages relative to said time base, and exchanges said time of arrival;

a displacement sensor that determines a distance travelled and orientation changed during a displacement relative to a common coordinate frame;

a database that holds a location of each of said transmitters in said common coordinate frame, and;

a processor for determining a relative range between said transceivers based on said send and receive time of said ranging messages and a differential range between said cooperative users based on measured time of arrival of each of said transmitters; and determining a position location of said cooperative users based on said relative range, said differential range, and said displacement.

27. The assembly according to claim 26, wherein said receiver, said transceiver, said displacement sensor, and said processor are integrally formed in a common assembly.

* * * * *